United States Patent
Hofbeck et al.

(10) Patent No.: US 7,319,405 B2
(45) Date of Patent: Jan. 15, 2008

(54) METHOD FOR SELF-DIAGNOSIS OF A SYSTEM

(75) Inventors: Klaus Hofbeck, Neumarkt (DE); Birgit Rösel, Regensburg (DE); Arnd Stielow, Regensburg (DE); Roland Wagner, Donaustauf (DE)

(73) Assignee: Siemens Aktiengesellschaft, Munich (DE)

( * ) Notice: Subject to any disclaimer, the term of this patent is extended or adjusted under 35 U.S.C. 154(b) by 196 days.

(21) Appl. No.: 11/214,567

(22) Filed: Aug. 30, 2005

(65) Prior Publication Data

US 2006/0042853 A1    Mar. 2, 2006

(30) Foreign Application Priority Data

Aug. 30, 2004   (DE) .................... 10 2004 041 878

(51) Int. Cl.
*G08B 21/00* (2006.01)

(52) U.S. Cl. .............................. 340/667; 701/45
(58) Field of Classification Search ........... 340/667; 280/734–735; 701/45
See application file for complete search history.

(56) References Cited

U.S. PATENT DOCUMENTS

| | | |
|---|---|---|
| 6,438,466 B1 | 8/2002 | Voigtlaender et al. |
| 6,598,900 B2 * | 7/2003 | Stanley et al. ............... 280/735 |
| 6,784,808 B2 | 8/2004 | Hoetzel et al. |
| 6,805,094 B2 | 10/2004 | Hashimoto et al. |
| 7,073,391 B2 | 7/2006 | Dukart |
| 2005/0280556 A1 | 12/2005 | Hofbeck et al. |
| 2006/0061470 A1 | 3/2006 | Hofbeck et al. |

FOREIGN PATENT DOCUMENTS

| | | |
|---|---|---|
| DE | 198 06 799 C1 | 8/1999 |
| DE | 199 02 185 A1 | 8/2000 |
| DE | 199 63 755 A1 | 7/2001 |
| DE | 102 54 233 A1 | 12/2003 |
| DE | 102 29 020 A1 | 1/2004 |
| DE | 102 54 197 A1 | 6/2004 |
| DE | 102 54 201 A1 | 6/2004 |
| EP | 0 694 003 B1 | 1/1996 |
| EP | 1 069 000 A1 | 1/2001 |

* cited by examiner

*Primary Examiner*—Jeffery Hofsass
*Assistant Examiner*—Shirley Lu
(74) *Attorney, Agent, or Firm*—Laurence A. Greenberg; Werner H. Stemer; Ralph E. Locher

(57) ABSTRACT

In a method for self-diagnosis of a system for seat occupancy detection, in particular for self-diagnosis of a HOBBIT system, a self-diagnosis signal that has been modulated in a predetermined manner is transmitted by the transmit unit to the receive unit of the base station and analyzed, preferably with the reflectors deactivated. From the analysis it is possible to make deductions about the operational integrity of the base station.

10 Claims, 2 Drawing Sheets

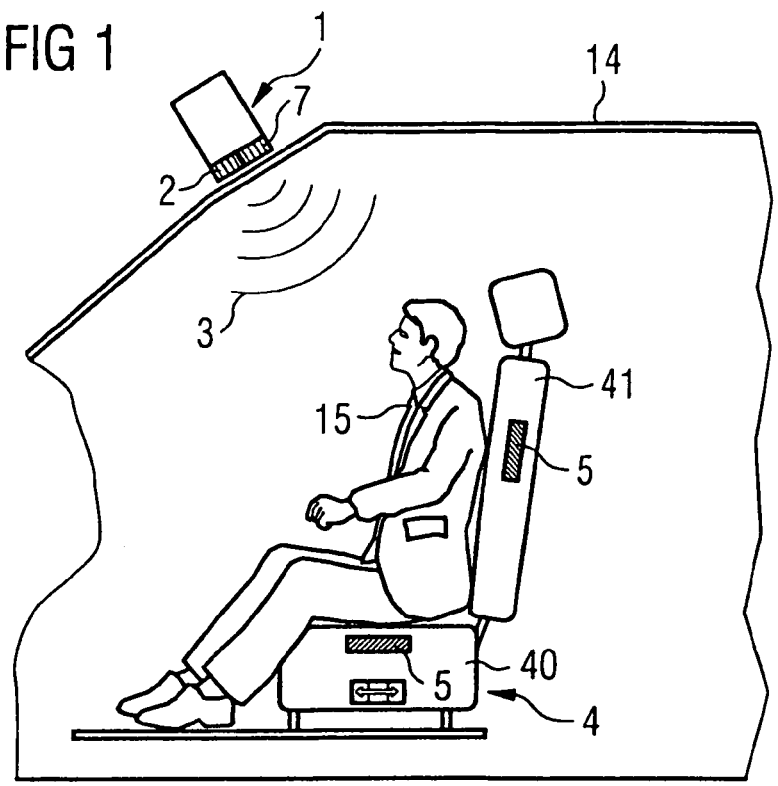
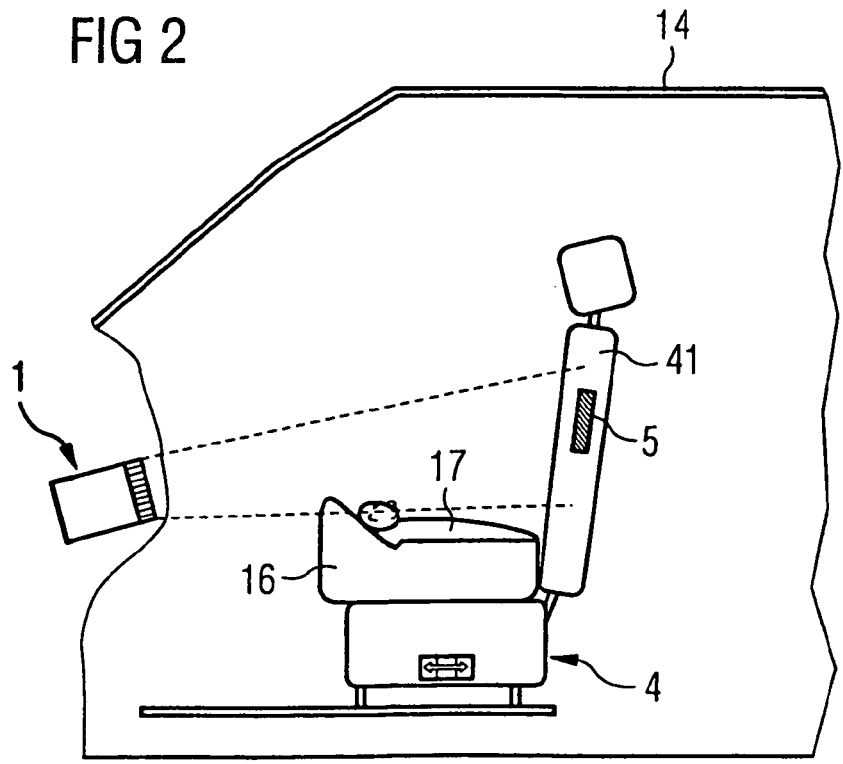

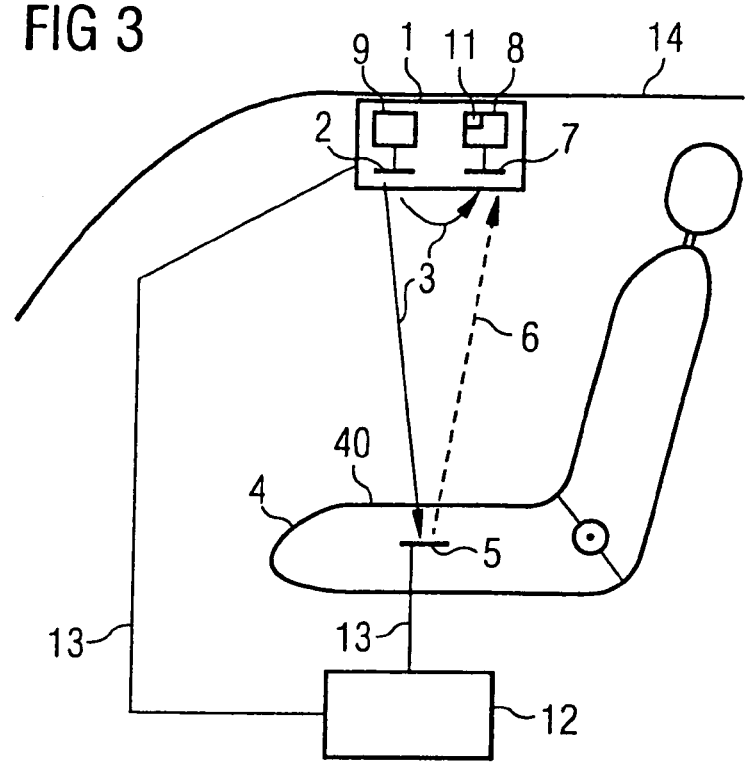
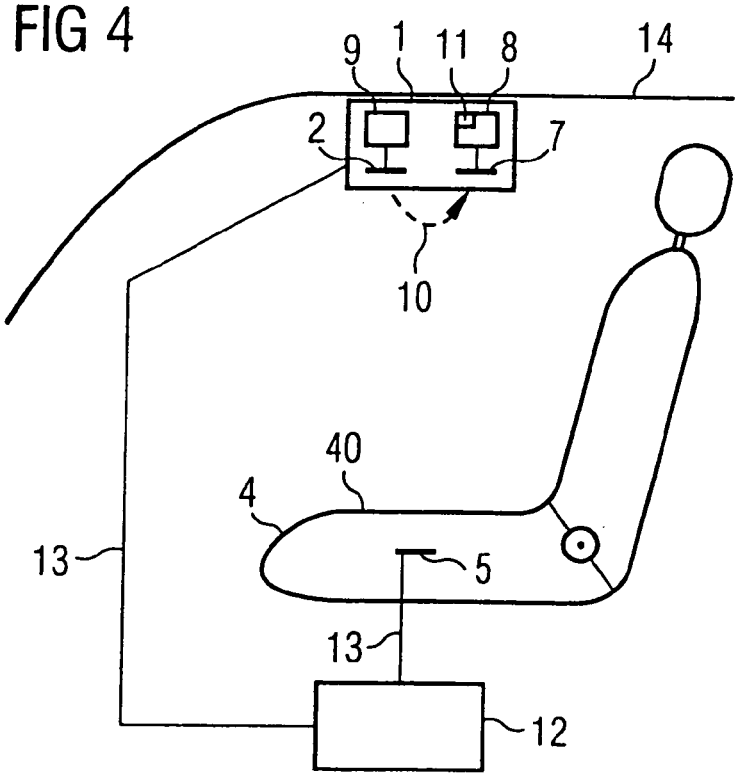

METHOD FOR SELF-DIAGNOSIS OF A SYSTEM

BACKGROUND OF THE INVENTION

Field of the Invention

The present invention relates to a method for self-diagnosis of a system, in particular for seat occupancy detection in an automotive vehicle, in order to control deployment of an airbag in the event of an accident, for example as a function of the corresponding seat occupancy.

Currently, a plurality of different systems for detecting seat occupancy are known. A novel, as yet unpublished system for seat occupancy detection currently being developed by the applicant is what is referred to as the HOBBIT system (HOBBIT=Human Observation by Beam Interference Technology). The HOBBIT system is formed of a central base station and individual reflectors in the seat for detecting a respective seat occupancy. With the HOBBIT system, use is beneficially made of a diffraction, attenuation and/or reflection of high-frequency signals (for example, 2.45 GHz waves) in order to detect the occupancy of the seat by a person. In the HOBBIT system, a space encompassing all of the seats to be monitored within a passenger compartment of a vehicle is illuminated by the high-frequency electromagnetic wave field. Toward that end, the base station transmits signals that strike the reflectors, at which they are modulated, reflected and received once again by the base station.

The reflector responses obtained in this way are evaluated with regard to their level. For this purpose, what is referred to as an attenuation thickness is calculated. The attenuation thickness designates a logarithm from the ratio of received levels and transmitted level or an assigned reference level. The value of the attenuation thickness is all the greater, the lower the level of the reflected signal received by the base station signal. The attenuation thickness is therefore a measure for the seat occupancy, so the occupation of the seat by a person or an object can be deduced from the attenuation thickness.

It is of great importance for the functionality of the HOBBIT system of the kind that the base station can evaluate all incoming signals with regard to the receive level and assign them to the respective identification code. For this purpose receive filters in the base station, for example, must function properly. Even a slight defect in the receive filter, for example a shifted mid-band frequency or an error in the analog/digital conversion, would have disadvantageous consequences since as a result thereof the backscattered signals from individual reflectors could not be evaluated at all or could only be evaluated on the basis of a falsified level.

In the event of a defective receive filter and/or a defective transmitter device, for example, no signals can be received. The system would therefore be deceived into concluding that the seat is occupied by an adult, which could result in the airbag being deployed. This can have lethal consequences for an infant occupying the seat.

Similarly, it can happen with a defective system of the kind that it outputs too low a level of the reflected signal. Thus, the system would again be deceived, for example, into concluding that the seat is occupied by an adult even though, for example, an infant in a child seat is occupying the seat. This would result in the deployment of the airbag in the event of an accident. Consequently an incorrect analysis of the kind can likewise lead to the infant suffering life-threatening injuries. The situation is analogous if the system incorrectly registers too high a receive signal, as a result of which deployment of an airbag may not be activated in the event of an accident in spite of the seat being occupied by an adult.

SUMMARY OF THE INVENTION

It is accordingly an object of the invention to provide a method for self-diagnosis of a system that overcomes the above-mentioned disadvantages of the prior art methods of this general type, which, in a simple and cost-effective manner, guarantees a check is made to determine the extent to which the complex base station of the HOBBIT system is operating free of error.

With the foregoing and other objects in view there is provided, in accordance with the invention, a method for self-diagnosis of a system containing at least one base station having a transmit unit for transmitting signals and a receive unit for receiving the signals reflected by at least one associated reflector for detecting a respective seat occupancy. The method includes transmitting, via the transmit unit of the base station, a modulated self-diagnosis signal having been modulated in a predetermined manner; receiving the modulated self-diagnosis signal being a cross-talking modulated self-diagnosis signal in the receive unit of the base station; and evaluating the cross-talking modulated self-diagnosis signal received for determining a self-diagnosis of operational integrity of the base station.

The idea on which the present invention is based is that in order for the system to perform a self-diagnosis, a self-diagnosis signal that has been modulated in a predetermined manner is transmitted by the transmit unit of the base station. A cross-talking modulated self-diagnosis signal is received by the receive unit of the base station. The received cross-talking modulated self-diagnosis signal is evaluated for the purpose of a self-diagnosis of the operability of the base station.

Thus, the present invention has the advantage over the prior art known to the applicant that a self-diagnosis can be performed on the basis of the generated modulated self-diagnosis signal without need for a modification of the system. No additional costs are therefore necessary for a self-diagnosis. Furthermore, the diagnostic method can be applied to all HOBBIT systems irrespective of how many reflectors are integrated in the motor vehicle. Moreover, the method according to the invention can be performed regardless of the seat occupancy in a particular case.

According to a preferred embodiment the reflection function of the individual reflectors is deactivated during the diagnostic method by, for example, a central control device connected to the individual reflectors and the base station. As a result the reflectors have no effect whatsoever on the self-diagnosis of the base station, so the base station can autonomously perform a self-check in a simple and cost-effective manner using simple test routines in order to verify its full operational integrity.

According to a further preferred embodiment, the self-diagnosis signal is modulated in a predetermined manner being frequency-modulated and/or amplitude-modulated. Amplitude modulation, which is easier to implement, is advantageously used or, as the case may be, superimposed on a frequency modulation. Furthermore, a phase modulation is also possible either alternatively or in addition.

According to a further preferred embodiment, the self-diagnosis signal modulated in a predetermined manner is embodied as an emulated signal of the respective assigned reflector. In this case each reflector is preferably assigned a separate diagnostic signal which, for example through the use of suitable circuit engineering measures, emulates the reflection signal assigned to the respective reflector in a seat occupancy detection mode of the system or, as the case may be, is embodied at least similarly to the signal of the respective reflector reflected in the seat occupancy detection mode. For example, the diagnostic method can be performed using a plurality of diagnostic signals, with each diagnostic signal being assigned to a reflector and adjusted to the actual reflection signal of the respective reflector. It is, of course, also possible to use a common self-diagnosis signal for a plurality of reflectors.

The operation of the system can preferably be switched back and forth between a seat occupancy detection mode and a self-diagnosis mode by, for example, the central control device, whereby a diagnostic method of the base station can advantageously be performed when the motor vehicle is started up, and/or additional diagnostic modes of operation can be performed at predetermined intervals while the motor vehicle is being driven, with the individual reflectors being deactivated during the diagnostic mode and the respective diagnostic signals being transmitted. As the diagnostic method is performed only for a period of, for example, milliseconds, the normal operation of the system is not compromised. During the seat occupancy detection mode, in contrast to the diagnostic mode, an unmodulated seat occupancy detection signal is transmitted by the transmit unit of the transmit unit of the base station. The unmodulated seat occupancy detection signal is advantageously converted into a characteristic modulated reflection signal by reflection at the assigned reflectors and superimposition of an identification code and transmitted to the receive unit of the base station.

The individual received signals, i.e. the received cross-talking modulated self-diagnosis signal in the self-diagnosis mode and also the seat occupancy detection signals, are analyzed in the receive unit by, for example, an evaluation device. The evaluation device is advantageously connected to the central control device or constitutes a component of the central control device.

According to a further preferred exemplary embodiment, a fault signal is output to the motor vehicle user in the event of a malfunction of the base station being diagnosed. This enables the vehicle user to call into a workshop for example in order to have the malfunction rectified.

Other features which are considered as characteristic for the invention are set forth in the appended claims.

Although the invention is illustrated and described herein embodied in a method for self-diagnosis of a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side-elevational view of a device for performing a method according to the invention in accordance with a first exemplary embodiment of the invention in the case of a seat occupied by an adult;

FIG. 2 is a diagrammatic, side-elevational view of the device for performing the method according to the invention in accordance with the first exemplary embodiment of the invention in the case of a seat occupied by an infant in a child seat;

FIG. 3 is a diagrammatic, side-elevational view of the seat occupancy detection device in a seat occupancy detection mode in accordance with a second exemplary embodiment of the invention; and FIG. 4 is a diagrammatic, side-elevational view of the seat occupancy detection device in a self-diagnosis mode in accordance with the second exemplary embodiment of the present invention.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a seat occupancy detection device for performing the method according to the invention in accordance with a first exemplary embodiment, with a seat being occupied by an adult 15. In the exemplary embodiment, purely by way of example, two reflectors 5 are installed in a vehicle seat 4. One reflector 5 is disposed in a backrest 41, with a further reflector 5 being provided in a seat squab 40. A base station 1 with a transmit antenna 2 integrated in a transmit unit and with a receive antenna 7 integrated in a receive unit 8 is mounted for example in a roof control unit 14.

In the seat occupancy detection mode the transmit antenna 2 of the transmit unit of the base station 1 transmits electromagnetic signals 3 which are advantageously embodied as an unmodulated wave. Following the reflection of the unmodulated signals 3 at the reflectors 5, the reflected signals are once again received by the receive antenna 7 of the receive unit of the base station 1 and subsequently analyzed by an assigned evaluation device.

So that the evaluation device can analyze how much power is being reflected by each individual reflector 5, the reflectors 5 preferably superimpose an identification code onto the unmodulated transmit signal 3, for example in the form of a frequency that is characteristic for the respective reflector 5 (frequency-modulated) and/or in the form of an amplitude characterizing the respective reflector (amplitude-modulated).

The unmodulated signals 3 are preferably reflected as part of a modulating backscatter process, with a coding being superimposed on the reflected radiation for example by the above described modulation. For this purpose the individual reflectors 5 can be embodied as passive, semi-passive, semi-active or active backscatter devices. In the base station 1 the modulated signals transmitted by the reflectors 5 can be evaluated with regard to distance (signal propagation delay), level and quality. If the seat 4 is unoccupied, the reflected modulated signal is received with a high level and with a high quality. If, on the other hand, the adult 15, for example, is occupying seat 4 in the proper manner, as illustrated in FIG. 1, then he completely covers the reflectors 5 and the base station 1 receives a level of the reflected signals that is several orders of magnitude smaller that in the case of an empty seat 4.

Superimposing an identification code onto the unmodulated transmit signal by the respective reflectors 5 additionally provides the advantage that the cross-talking of the transmit antenna 2 onto the receive antenna 7, i.e. the direct transmission of interference signals from the transmit antenna 2 onto the receive antenna 7, has no further effect on the receive path of the seat occupancy detection signals.

FIG. 2 illustrates the seat occupancy detection device for performing the method in accordance with the first exemplary embodiment of the invention in the case of seat occupancy by an infant 17 traveling in a child seat 16. As can be seen in FIG. 2, the infant 17 is placed in what is known as a "reboard" seat 16. The seat 16 is fixed on the front passenger seat in the proper manner. Owing to the relative positions of the base station 1, the transmit antenna 2, the receive antenna 7, the reflectors 5 and the child seat 16, only a slight attenuation of the radiation transmitted for example as microwave radiation takes place. In this case, as already explained above, high-frequency signals, for example, at a frequency of, for example, 2.45 GHz are beneficially used. It is, however, obvious to a person skilled in the art that the present method can also be performed using other frequencies and radiations.

On account of the lower attenuation of the microwave radiation the signals can be classified as indicating that the seat is not occupied by an adult, but by the infant 17 traveling in the child seat 16. Consequently a triggering of the airbag is prevented in order to prevent the child 17 from being put at risk.

Although applicable to any reflectors 5, the method for diagnosis of the base station 1 will be explained in an exemplary manner with reference to a reflector 5 provided in the seat squab 40 of seat 4.

FIG. 3 illustrates a schematic representation of the above-explained system that executes a seat occupancy detection mode according to a second exemplary embodiment of the present invention. As can be seen in FIG. 3, both the base station 1 and the reflector 5 are preferably connected for data communication purposes to a common central control device 12 via suitable data links 13.

In the seat occupancy detection mode the transmit antenna 2 of a transmit unit 9 transmits, as already explained above, an unmodulated signal 3, which is reflected by the reflector 5 in the direction of the receive antenna 7 of the receive unit 8 as a modulated reflection signal 6 and analyzed by an evaluation device 11 integrated for example in the receive unit 8. An evaluation of this kind can also be performed by the central control device 12 connected to the base station.

As can also be seen in FIG. 3, the transmitted unmodulated signal 3 is also partially injected directly into the receive antenna 7. However, since the reflection signal 6 modulated by the reflector 5 is received by the receive antenna 7 and subsequently decoded in the evaluation device 11 and analyzed with regard to the level for example, the directly injected wave or, as the case may be, the directly injected signal 3 is not taken into account in the evaluation device due to a lack of modulation of said kind.

FIG. 4 illustrates a schematic representation of an above-explained system that executes a self-diagnosis mode in accordance with an exemplary embodiment of the present invention. In contrast to the seat occupancy detection mode according to FIG. 3, the transmit antenna 2 does not transmit an unmodulated signal 3, but instead a modulated self-diagnosis signal 10 is generated and transmitted. Preferably, as shown in FIG. 4, the operability of the reflector 5 is deactivated by the central control device 12 in such a way that no reflection of the modulated signal 10 by the reflector 5 takes place. As a result the receive antenna 7 receives only the directly injected, modulated self-diagnosis signal 10 which is not affected by reflected signals because of a deactivation of the reflector 5. Thus, the base station 1 can autonomously perform a self-check using simple test routines in order to verify its full operational integrity, whereby the transmitted and the received self-diagnosis signals are compared with each other or, as the case may be, the received self-diagnosis signal is evaluated.

In the self-diagnosis mode of the base station 1, the transmit unit 9, making use of suitable circuit engineering measures, preferably emulates the signal of the reflector 5 reflected in the seat occupancy detection mode. This can be affected for example in that the central control device 12 modulates the self-diagnosis signal in such a way or, as the case may be, superimposes on the self-diagnosis signal an identification code that corresponds to that which the reflector 5 would superimpose on the unmodulated wave 3 in the seat occupancy detection mode. As a result of the finite crosstalk attenuation, the modulated self-diagnosis signal 10 reaches the receive antenna 7. The modulated self-diagnosis signal 10 can then be analyzed for example in the evaluation device 11 or the central control device 12 so that deductions concerning the operational integrity of the base station 1 can be guaranteed.

Although the method according to the invention has been explained for the sake of simplicity purely in an exemplary fashion with reference to a reflector 5, a plurality of reflectors 5 usually exist in the individual seats of the motor vehicle. In such a configuration a common base station 1 can be provided for all seats of the motor vehicle or a dedicated base station can be assigned to each seat.

The above described self-diagnosis method of the base station 1 can be performed for example using a single standardized modulated self-diagnosis signal 10 predetermined for all reflectors assigned to the base station 1. Alternatively, of course, a plurality of different modulated self-diagnosis signals 10 can be used, of which each modulated self-diagnosis signal 10 is assigned to one reflector 5 in each case. Here, the individual modulated self-diagnosis signals 10 are preferably embodied in each case by a modulation of kind or, as the case may be, an identification code which is preferably the same or at least similar to the modulation or, as the case may be, identification code which the respective reflector would superimpose on the received unmodulated signal 3 in the seat occupancy detection mode.

For example, a plurality of reflectors have the same frequency modulation, with a different amplitude modulation being superimposed in each case to provide a unique identification code. It is obvious to a person skilled in the art that any types of modulation, for example frequency and/or amplitude modulation, are suitable provided it is possible to differentiate the individual reflectors. A form of frequency modulation is used for example in the KHz range.

Furthermore a standardized diagnostic signal can be used instead of the self-diagnosis signals assigned to the respective reflectors, which standardized diagnostic signal checks the operational integrity of the base station 1 overall, as already explained above.

According to a further preferred exemplary embodiment a self-diagnosis can also be performed in the sense that a check is made for the presence of additional interference signals. For example, the transmit device is briefly switched off by the central control device in the diagnostic mode of operation and the received level analyzed at the receive antenna 7. If a high receive level continues to be measured, then additional interference signals are present in the motor vehicle, falsifying the actual result. In addition, the individual reflectors can be switched on and off by the central control device simultaneously or in succession. In this case the receive level received at the receive antenna 7 is likewise analyzed. If, for example, the receive unit 8 receives a higher receive level with a reflector switched on and the transmit device switched off than with a reflector switched off and the transmit device switched off, then the interference signals roughly correspond to the signals actually transmitted by the transmitter device. Interference signals of this kind have a negative effect in particular on the system, so a self-diagnosis in such a case appears extremely useful.

Thus, the present invention creates a method for self-diagnosis in particular of a HOBBIT system for seat occupancy detection which checks, in a simple and cost-effective manner, whether the complex base station is operating free of error, in particular whether the base station can evaluate all incoming signals with regard to the receive level and assign them to the respective identification code.

Furthermore, the method according to the invention can be used for calibrating the receiver (high-frequency and digital section) in a simple and cost-effective manner.

Although the present invention has been described in the foregoing with reference to preferred exemplary embodiments, it is not limited thereto, but can be modified in a wide variety of ways.

The above explained diagnostic mode of operation can be performed, for example, at the beginning of a car journey or in addition regularly at predetermined intervals during the journey. Since a diagnostic mode of operation of this kind takes only a period of time in the millisecond range, the actual seat occupancy detection mode of operation is not disrupted thereby.

It is also possible that the reflector(s) is(are) embodied as active reflectors, i.e. as independent transmitter devices. In this case the reflectors embodied as transmitter devices can transmit uniquely assignable modulated self-diagnosis signals which can be analyzed for diagnostic purposes by the receive unit provided in the roof.

Moreover, the diagnostic method is not limited to a seat occupancy detection system in the automotive vehicle sector. Rather, the diagnostic method according to the invention can be used for all systems that have a transmitter device for transmitting a transmit signal and a receiver device for receiving a receive level, such as, for example, transponder systems or suchlike.

This application claims the priority, under 35 U.S.C. § 119, of German patent application No. 10 2004 041 878.0, filed Aug. 30, 2004; the entire disclosure of the prior application is herewith incorporated by reference.

We claim:

1. A method for self-diagnosis of a system containing at least one base station having a transmit unit for transmitting signals and a receive unit for receiving the signals reflected by at least one associated reflector for detecting a respective seat occupancy, which comprises the steps of:

deactivating a reflection function of the at least one reflector during the diagnostic method by a central control device connected to the at least one reflector and the base station;

transmitting, via the transmit unit of the base station, a modulated self-diagnosis signal having been modulated in a predetermined manner;

receiving the modulated self-diagnosis signal being a cross-talking modulated self-diagnosis signal in the receive unit of the base station; and evaluating the cross-talking modulated self-diagnosis signal received for determining a self-diagnosis of operational integrity of the base station.

2. The method according to claim 1, which further comprises forming the modulated self-diagnosis signal in the predetermined manner by performing at least one of frequency-modulation and/or amplitude-modulation.

3. The method according to claim 1, which further comprises forming the modulated self-diagnosis signal in the predetermined manner as an emulated signal of the at least one reflector.

4. The method according to claim 1, which further comprises switching an operation of the system back and forth, via the central control device, between a seat occupancy detection mode and a self-diagnosis mode.

5. The method according to claim 4, which further comprises:

activating the reflection function of the at least one reflector by the central control device connected to the at least one reflector and the base station; and transmitting an unmodulated seat occupancy detection signal by the transmit unit in the seat occupancy detection mode.

6. The method according to claim 4, which further comprises analyzing the cross-talking modulated self-diagnosis signal received in an evaluation device provided with the receive unit of the base station, the evaluation device being connected to the central control device or embodied as a component of the central control device.

7. The method according to claim 1, which further comprises outputting a fault signal to a motor vehicle user in a case of a diagnosed malfunction of the base station.

8. The method according to claim 1, which further comprises calibrating the receive unit.

9. The method according to claim 8, which further comprises calibrating a high-frequency and digital section of the receive unit.

10. The method according to claim 1, wherein the system is a seat occupancy detector in an automotive vehicle.

* * * * *